US012566621B2

(12) United States Patent
Abdul Rawoof et al.

(10) Patent No.: US 12,566,621 B2
(45) Date of Patent: Mar. 3, 2026

(54) CUSTOMIZATION AND ENRICHMENT OF USER INTERFACES USING LARGE LANGUAGE MODELS

(71) Applicant: Intuit Inc., Mountain View, CA (US)

(72) Inventors: Ismail Abdul Rawoof, Toronto (CA); Himanshu Sharma, Mississauga (CA); Yunqian Li, Toronto (CA); Falguni Trivedi, Brampton (CA); Sarah Ferridge, Mississauga (CA)

(73) Assignee: Intuit Inc., Mountain View, CA (US)

( * ) Notice: Subject to any disclaimer, the term of this patent is extended or adjusted under 35 U.S.C. 154(b) by 339 days.

(21) Appl. No.: 18/375,383

(22) Filed: Sep. 29, 2023

(65) Prior Publication Data

US 2025/0110760 A1 Apr. 3, 2025

(51) Int. Cl.
*G06F 9/451* (2018.01)
*G06F 16/34* (2025.01)

(52) U.S. Cl.
CPC ............ *G06F 9/453* (2018.02); *G06F 16/345* (2019.01)

(58) Field of Classification Search
CPC ................................ G06F 9/453; G06F 16/345
See application file for complete search history.

(56) References Cited

U.S. PATENT DOCUMENTS

| | | | | |
|---|---|---|---|---|
| 11,916,767 | B1 * | 2/2024 | Wu | H04L 43/04 |
| 2024/0038226 | A1 * | 2/2024 | Nouri | G10L 15/063 |
| 2024/0330863 | A1 * | 10/2024 | Hajarnis | G06Q 10/1053 |
| 2024/0354503 | A1 * | 10/2024 | Baruch | G06F 16/345 |
| 2024/0354555 | A1 * | 10/2024 | Knipfing | G06N 3/0455 |
| 2024/0412030 | A1 * | 12/2024 | Guinn | G06N 3/045 |
| 2024/0419706 | A1 * | 12/2024 | Gutierrez | G06F 40/166 |
| 2024/0428260 | A1 * | 12/2024 | Mico | G06Q 30/016 |

* cited by examiner

*Primary Examiner* — Tadesse Hailu
(74) *Attorney, Agent, or Firm* — Lathrop GPM LLP

(57) ABSTRACT

A method including generating a revised prompt from user customization data for customizing a user interface of an application, a pre-engineered prompt, and an application artifact from the application. The method also includes generating an output by executing a large language model on the revised prompt. The method also includes receiving a modified template generated from the user customization data and at least one of a set of templates. The method also includes transforming the output of the large language model and the modified template into both a consumable user interface component and a user interface artifact. The method also includes modifying a user interface of the application by applying the consumable user interface component and the user interface artifact to the application.

20 Claims, 11 Drawing Sheets

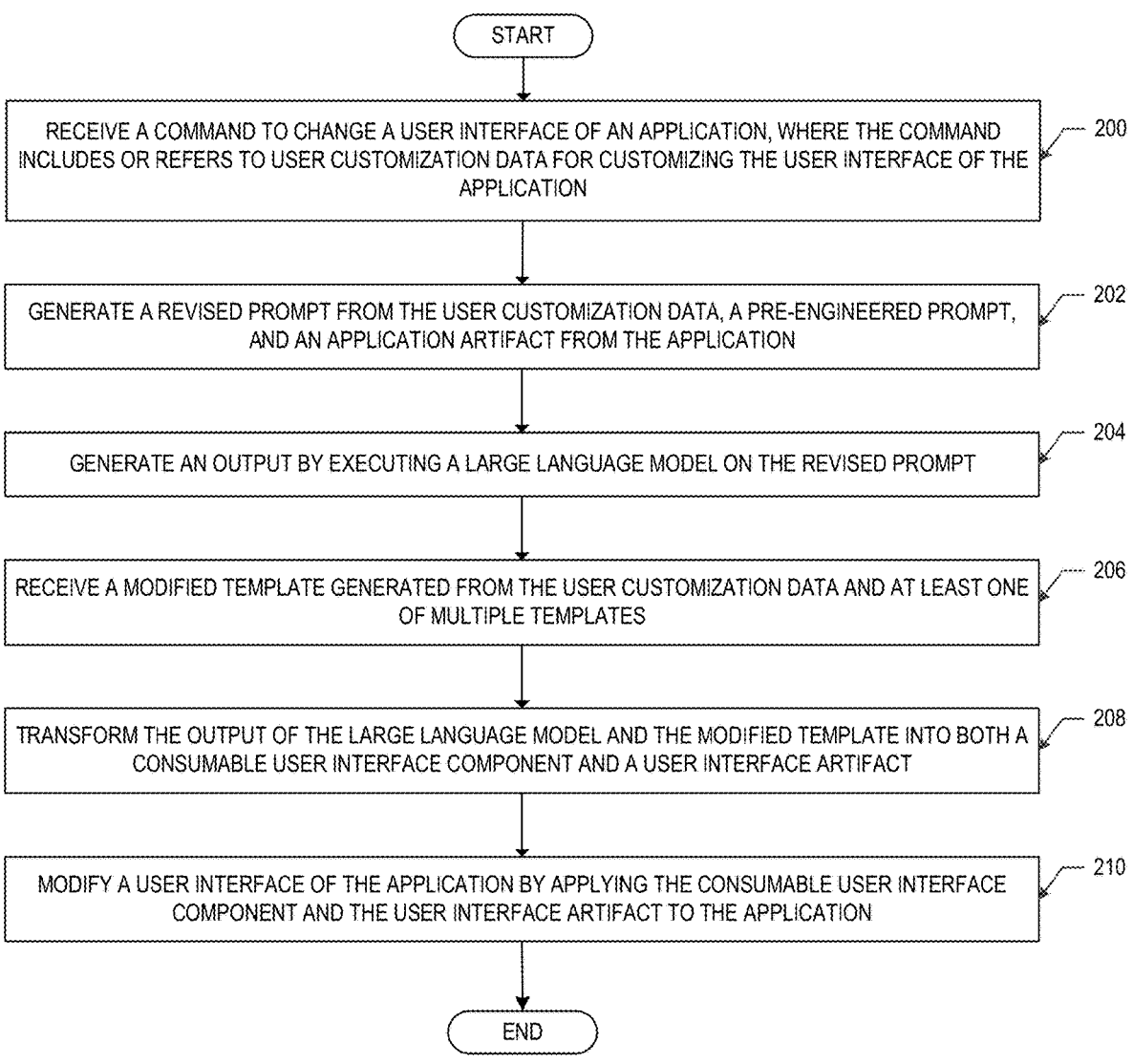

START

RECEIVE A COMMAND TO CHANGE A USER INTERFACE OF AN APPLICATION, WHERE THE COMMAND INCLUDES OR REFERS TO USER CUSTOMIZATION DATA FOR CUSTOMIZING THE USER INTERFACE OF THE APPLICATION — 200

GENERATE A REVISED PROMPT FROM THE USER CUSTOMIZATION DATA, A PRE-ENGINEERED PROMPT, AND AN APPLICATION ARTIFACT FROM THE APPLICATION — 202

GENERATE AN OUTPUT BY EXECUTING A LARGE LANGUAGE MODEL ON THE REVISED PROMPT — 204

RECEIVE A MODIFIED TEMPLATE GENERATED FROM THE USER CUSTOMIZATION DATA AND AT LEAST ONE OF MULTIPLE TEMPLATES — 206

TRANSFORM THE OUTPUT OF THE LARGE LANGUAGE MODEL AND THE MODIFIED TEMPLATE INTO BOTH A CONSUMABLE USER INTERFACE COMPONENT AND A USER INTERFACE ARTIFACT — 208

MODIFY A USER INTERFACE OF THE APPLICATION BY APPLYING THE CONSUMABLE USER INTERFACE COMPONENT AND THE USER INTERFACE ARTIFACT TO THE APPLICATION — 210

END

*FIG. 2*

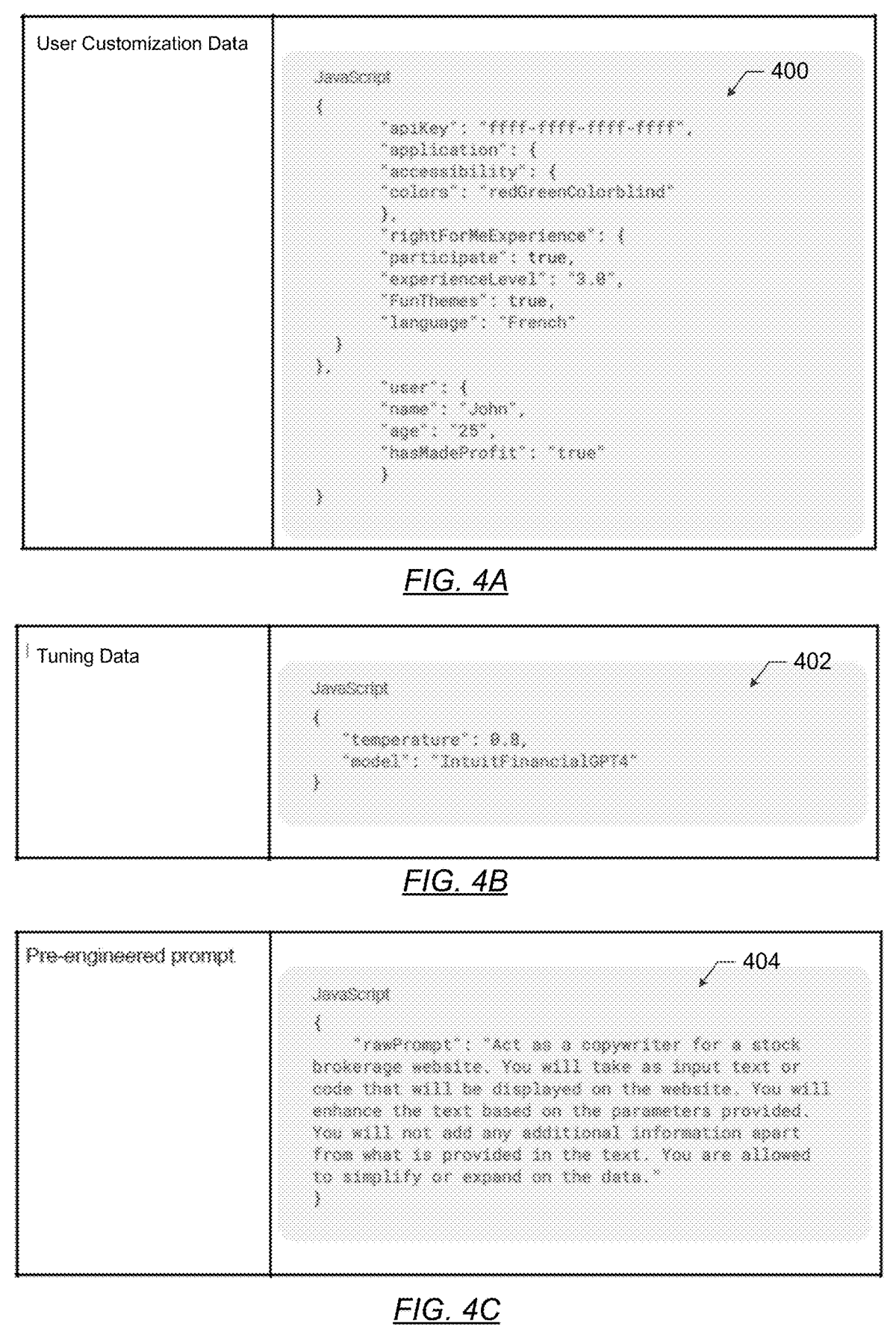

User Customization Data

```javascript
JavaScript                                           400
{
        "apiKey": "ffff-ffff-ffff-ffff",
        "application": {
        "accessibility": {
        "colors": "redGreenColorblind"
        },
        "rightForMeExperience": {
        "participate": true,
        "experienceLevel": "3.0",
        "FunThemes": true,
        "language": "French"
    }
}, "user": {
    "name": "John",
    "age": "25",
    "hasMadeProfit": "true"
    }
}
```

*FIG. 4A*

Tuning Data

```javascript
JavaScript                                           402
{
    "temperature": 0.8,
    "model": "IntuitFinancialGPT4"
}
```

*FIG. 4B*

Pre-engineered prompt

```javascript
                                                     404
JavaScript
{
    "rawPrompt": "Act as a copywriter for a stock
brokerage website. You will take as input text or
code that will be displayed on the website. You will
enhance the text based on the parameters provided.
You will not add any additional information apart
from what is provided in the text. You are allowed
to simplify or expand on the data."
}
```

*FIG. 4C*

Revised Prompt

```
JavaScript

{
    "finalPrompt": "Act as a copywriter for a stock
brokerage website. You will take as input code from
function hal9000. You will enhance the text to be
viewed by an intermediate experienced user and will
respond only in French. You will not add any
additional information apart from what is provided
in the text. You are allowed to simplify complex
terms."
}
```

LLM Output

```
JavaScript
Slot1 = (
    <div>
        Bonjour John,
Puisque vous connaissez déjà un peu les actions, nous
vous recommandons de maintenir vos gains à environ 20
% afin de minimiser vos impôts dus pour cette année.
    </div>
)
className = "colorBlindDeuteranomaly";
return (<div class={...classNames}>
    <div>
        {Slot1}
```

```
    </div>
</div>)
```

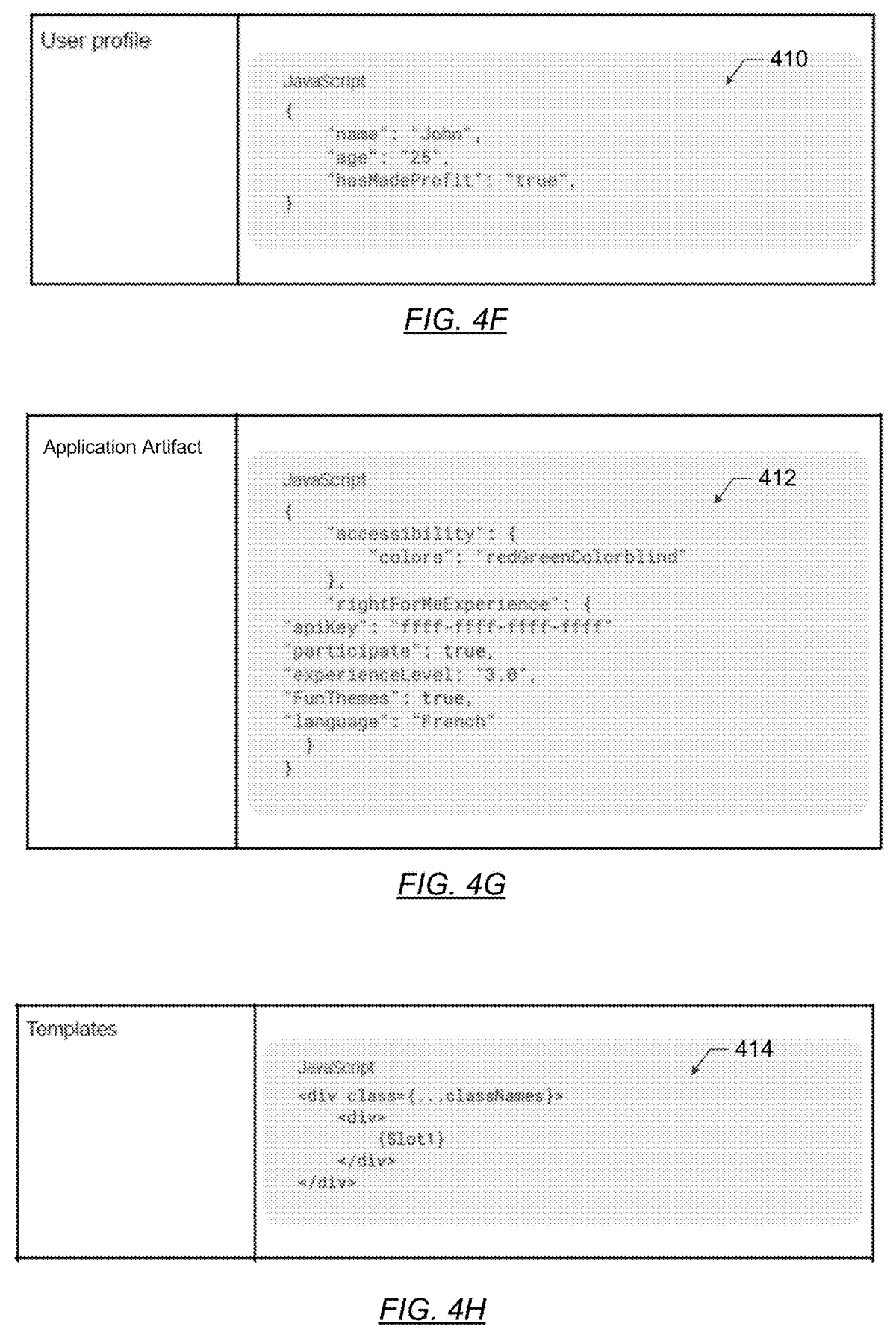

User profile

```
JavaScript                                    ⟋— 410
{
    "name": "John",
    "age": "25",
    "hasMadeProfit": "true",
}
```

*FIG. 4F*

Application Artifact

```
JavaScript                                    ⟋— 412
{
    "accessibility": {
        "colors": "redGreenColorblind"
    },
    "rightForMeExperience": {
"apiKey": "ffff-ffff-ffff-ffff"
"participate": true,
"experienceLevel: "3.0",
"FunThemes": true,
"language": "French"
    )
}
```

*FIG. 4G*

Templates

```
JavaScript                                    ⟋— 414
<div class={...classNames}>
    <div>
        {Slot1}
    </div>
</div>
```

*FIG. 4H*

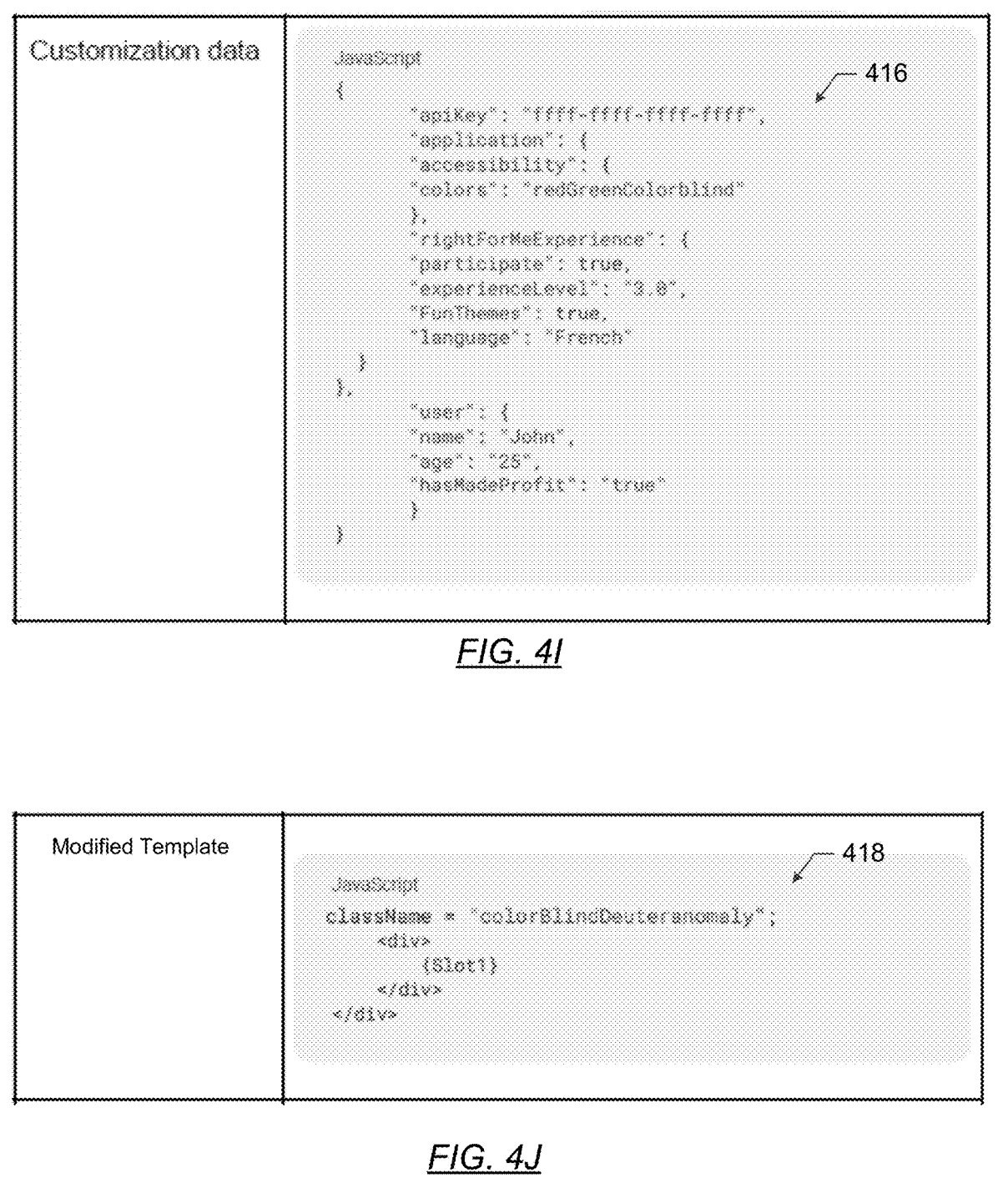

Customization data

```
JavaScript
{
    "apiKey": "ffff-ffff-ffff-ffff",
    "application": {
    "accessibility": {
    "colors": "redGreenColorblind"
    },
    "rightForMeExperience": {
    "participate": true,
    "experienceLevel": "3.0",
    "FunThemes": true,
    "language": "French"
    }
    }, "user": {
    "name": "John",
    "age": "25",
    "hasMadeProfit": "true"
    }
}
```
416

FIG. 4I

Modified Template

```
JavaScript
className = "colorBlindDeuteranomaly";
    <div>
        {Slot1}
    </div>
</div>
```
418

FIG. 4J

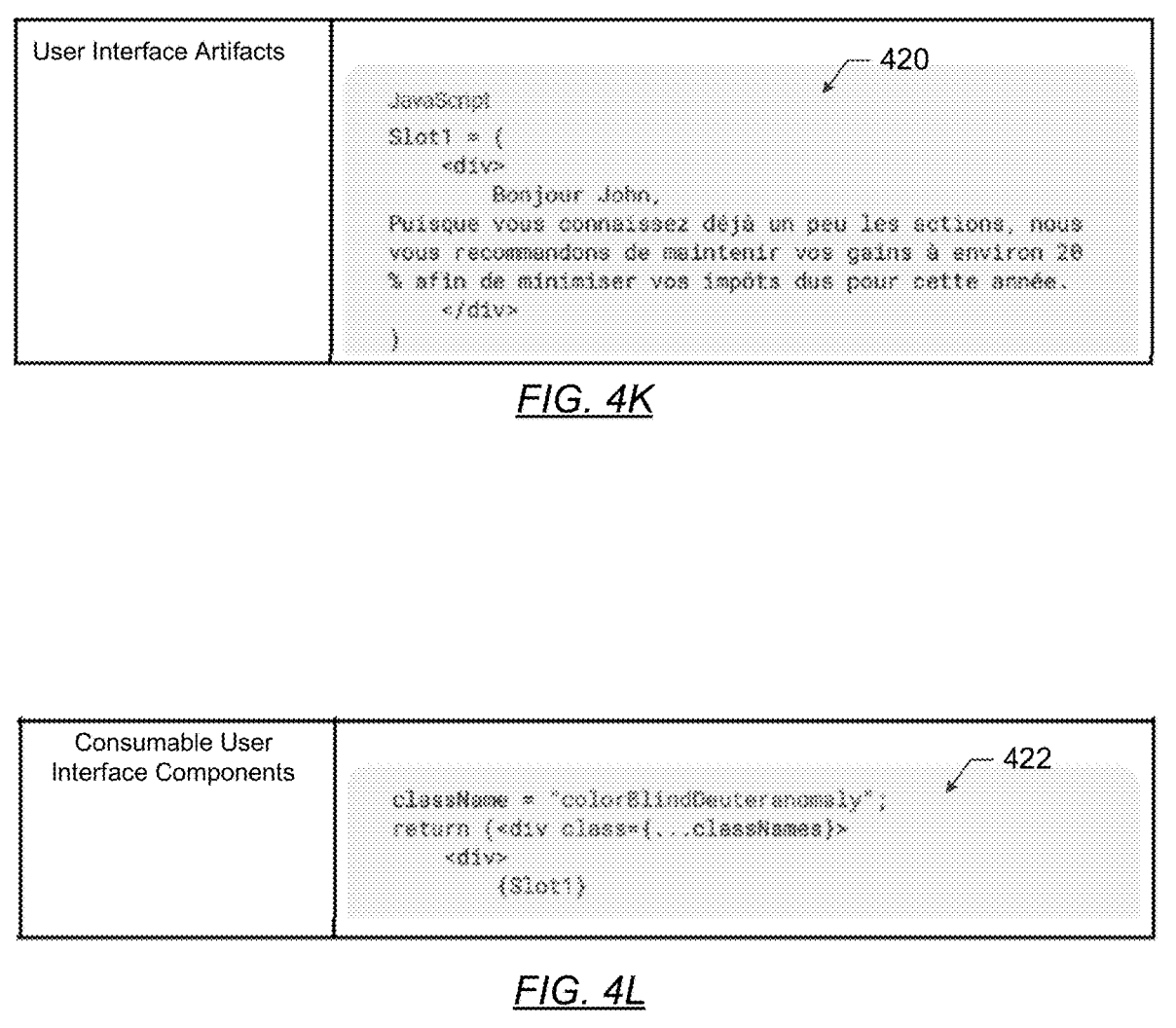

| User Interface Artifacts | |
|---|---|
| | ⌐— 420 |
| | JavaScript |
| | Slot1 = ( |
| | <div> |
| | Bonjour John, |
| | Puisque vous connaissez déjà un peu les actions, nous |
| | vous recommandons de maintenir vos gains à environ 20 |
| | % afin de minimiser vos impôts dus pour cette année. |
| | </div> |
| | ) |

*FIG. 4K*

| Consumable User Interface Components | |
|---|---|
| | ⌐— 422 |
| | className = "colorBlindDeuteranomaly"; |
| | return (<div class=(...classNames)> |
| | <div> |
| | (Slot1) |

CUSTOMIZATION AND ENRICHMENT OF USER INTERFACES USING LARGE LANGUAGE MODELS

BACKGROUND

User interfaces provide a user the ability to interact with an application executing on a computing system. An example of a user interface may be a window, a menu, and a dialog box in which user may enter text via one or more user input devices. The menu may be used, for example, to manipulate the text in the dialog box.

User interfaces may be complex, and also may relate to complex subject matter. For example, an application programmed to assist an accountant with preparing difficult tax returns may have many functions and may also present complex, technical tax information to the user.

However, not all users of the application may be subject matter experts in tax matters. Therefore, some users may be unable to use the advanced features of the user interface, or some users may not understand technical information presented via the user interface. Such users may become frustrated and stop using the application, which may be undesirable to the organization responsible for making the application available to users.

SUMMARY

The one or more embodiments provide for a method. The method includes generating a revised prompt from user customization data for customizing a user interface of an application, a pre-engineered prompt, and an application artifact from the application. The method also includes generating an output by executing a large language model on the revised prompt. The method also includes receiving a modified template generated from the user customization data and at least one of a set of templates. The method also includes transforming the output of the large language model and the modified template into both a consumable user interface component and a user interface artifact. The method also includes modifying a user interface of the application by applying the consumable user interface component and the user interface artifact to the application.

The one or more embodiments also provide for a system. The system includes a processor and a data repository in communication with the processor. The data repository stores user customization data, a pre-engineered prompt, an application artifact, and a revised prompt. The data repository also stores an output of a large language model and a template selected from among a set of templates. The data repository also stores a modified template, a consumable user interface component, and a user interface artifact. The system also includes a platform executable by the processor. The platform includes a prompt generator which, when executed by the processor, generates the revised prompt from the user customization data, the pre-engineered prompt, and the application artifact. The platform also includes a large language model which, when executed by the processor receives, as input, the revised prompt, and generates the output. The platform also includes a binder which, when executed by the processor, receives the modified template, and transforms the output and the modified template into both the consumable user interface component and the user interface artifact. The platform also includes an application executable by the processor. The application includes a user interface that is programmed to modify the user interface by applying the consumable user interface component and the user interface artifact to the application.

The one or more embodiments provide for another method. The method includes receiving a command to change a user interface of an application. The command includes or refers to user customization data for customizing the user interface of the application. The method also includes generating a revised prompt from the user customization data, a pre-engineered prompt, and an application artifact from the application. The method also includes generating an output by executing a large language model on the revised prompt. The method also includes receiving a modified template generated from the user customization data and at least one of a set of templates. The method also includes transforming the output of the large language model and the modified template into both a consumable user interface component and a user interface artifact. The method also includes modifying a user interface of the application by applying the consumable user interface component and the user interface artifact to the application.

Other aspects of one or more embodiments will be apparent from the following description and the appended claims.

BRIEF DESCRIPTION OF DRAWINGS

FIG. 2 shows a method, in accordance with one or more embodiments.

FIG. 4A, FIG. 4B, FIG. 4C, FIG. 4D, FIG. 4E, FIG. 4F, FIG. 4G, FIG. 4H, FIG. 4I, FIG. 4J, FIG. 4K, FIG. 4L, FIG. 4M, and FIG. 4N are examples of data constructs and code snippets which serve as specific examples of the data flow shown in FIG. 3B, in accordance with one or more embodiments.

Like elements in the various figures are denoted by like reference numerals for consistency.

DETAILED DESCRIPTION

Figure 1:
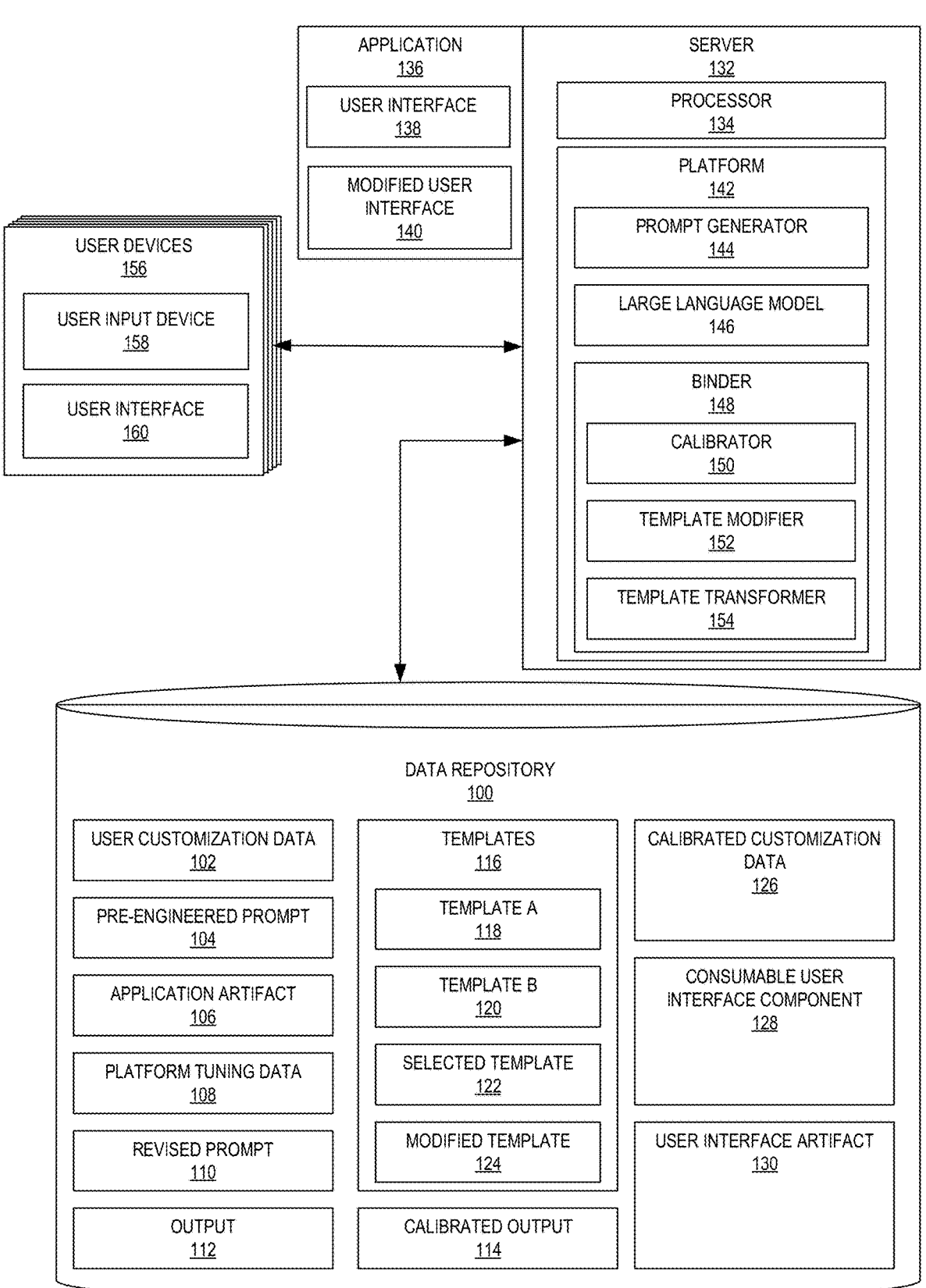
FIG. 1 shows a computing system, in accordance with one or more embodiments.

In general, embodiments are directed to improvements in automatically configuring a user interface of an executing application to accommodate users of different preferences and skill levels. It may be possible to automatically configure the user interface to a selected one of a set number of user interfaces based on some input. For example, a user might self-report as a "new" user and a simplified user interface then presented to the user.

However, such an approach is both clumsy and may not accommodate the specific preferences or needs of a specific user. For example, a technically sophisticated user may understand both the user interface and the technical information presented via the user interface; however, the sophisticated user may not need many of the functions offered by the application. In another example, not all new users are the same. Different new users may desire different user interfaces, depending on their relative skill level and preferences.

A technical problem exists with respect to automatically adjusting a user interface to fit the specific desires and needs of a specific user. Namely, it is not possible to automatically configure a user interface for each specific user, because each specific user is unique. It is not possible for a computer scientist responsible for building or maintaining the application to predict what a unique user may want or need. Conversely, it may not be possible for a specific user to adjust the user interface for the specific user's desires and needs, because the user may lack the programming experience or familiarity with the application to so modify the user interface. In some cases, the organization responsible for maintaining the application may wish to deny users authorization to change the user interface. Therefore, automatically configuring user-specific user interfaces for an application remains a technical problem.

One or more embodiments described herein represent at least one technical solution to the technical problem described above. In particular, one or more embodiments provide for a combination of a large language model and a binder that generate one or more consumable user interface components and one or more user interface artifacts. The application in question may take, as input, the consumable user interface components and the user interface artifacts, and then generate, as output a modified user interface for the application.

Still more particularly, the one or more embodiments combine pre-engineered prompts and user customization data to generate a revised prompt. The revised prompt is provided to the large language model. Additionally, a user interface modified template is generated from available templates and user customization data. The output of the large language model and the user interface modified template are provided to a template transform that converts the large language model output and the modified template into the consumable user interface components and the user interface artifacts. The consumable user interface components and the user interface are then provided to the application, which then adjusts the user interface of the application accordingly.

In this manner, the user interface of the application may be automatically adjusted according to the specific, or unique, needs or desires of each unique user. Accordingly, one or more embodiments may solve at least some aspects of the technical problem described above.

Attention is now turned to the figures. FIG. 1 shows a computing system, in accordance with one or more embodiments. The system shown in FIG. 1 includes a data repository (100). The data repository (100) is a type of storage unit and/or device (e.g., a file system, database, data structure, or any other storage mechanism) for storing data. The data repository (100) may include multiple different, potentially heterogeneous, storage units and/or devices.

The data repository (100) also may store user customization data (102). The user customization data (102) is data that relates to a user controlling customization of the application (136) (defined below). Note that the user customization data (102) need not be data received from a user, as the user customization data (102) may be data pre-stored for a type of user or for use in response to data received from a user. The user customization data (102) may include, for example, a user profile, application settings related to information included the user profile, etc. The user profile is information that describes the user (e.g., name, age, occupation, self-reported skill level of the user, a determined skill level of the user (based on the user's use of certain functions of the application (136)), etc.). An example of the user customization data (102) in the form of a user profile is shown in FIG. 4F.

The data repository (100) also may store pre-engineered prompt (104). The pre-engineered prompt (104) is alphanumeric text and possibly other information for use in generating a prompt to the large language model (146) (defined below). The pre-engineered prompt (104) may be determined automatically by a rules or by operation of the large language model (146) itself (i.e., it is possible to command the large language model (146) to generate a prompt to the large language model (146)). The modified user interface (140) may be determined by a skilled technician, possibly in conjunction with a subject matter expert who has expertise in the application (136). An example of the pre-engineered prompt (104) is shown in FIG. 4C.

The data repository (100) also may store an application artifact (106). The application artifact (106) is alphanumeric text or other information taken from the application (136). For example, the application artifact (106) may be text displayed to a user of the application (136). In another example, the application artifact (106) may be a color scheme used for the application (136). Many different types of data may be included in the application artifact (106). An example of the application artifact (106) is shown in FIG. 4K (which also is an example of the user interface artifacts (284) described with respect to FIG. 3B).

The data repository (100) also may store platform tuning data (108). The platform tuning data (108) is data related to the platform (142) (defined below) that can influence execution of or presentation of the application (136). For example, the platform (142) may include instructions to the server (132) for how to execute the application (136) based on a reported skill level of the user of the application (136). The platform tuning data (108) also could include information related to which versions of the application (136) stored on the server (132) may be executed, or various settings to be applied to the application (136). An example of the platform tuning data (108) is shown in FIG. 4B.

The data repository (100) also may store a revised prompt (110). The revised prompt (110) is the final prompt provided to the large language model (146) in the process of determining the consumable user interface components (282) and user interface artifacts (284) as described with respect to FIG. 3B. The revised prompt (258) (FIG. 3B) may be a combination of the user customization data (102), the pre-engineered prompt (104), the application artifact (106), and, in an embodiment, may include the platform tuning data (108). Generation of the revised prompt (110) is described with respect to FIG. 2 and FIG. 3B. An example of the revised prompt (110) is shown in to FIG. 4D.

The data repository (100) also may store an output (112). The output (112) is the output of the large language model (146) when the large language model (146) is executed on the revised prompt (110). Generation of the output (112) is described with respect to FIG. 2 and FIG. 3B. An example of the output (112) is shown in FIG. 4E.

The data repository (100) also may store a calibrated output (114). The calibrated output (114) is the output (112) after a calibration process is executed on the output (112). In an embodiment, the output (112) is not calibrated, but is used directly in place of the calibrated output (114). Thus, FIG. 4E could also be considered an example of the calibrated output (114).

The data repository (100) also may store one or more templates (116), such as template A (118) and template B (120). The templates (116) are data structures that define various configurations of the application (136). For example, each template may define, for the user interface of the application (136), a color scheme, a layout of dialog boxes, a layout of widgets, the types of widgets presented, etc. The templates (116) may be pre-determined templates. An example of one possible template for the templates (116) is shown in FIG. 4A.

The data repository (100) also may store a selected template (122). The selected template (122) is one of the templates (116) that has been selected for use in modifying the user interface of the application (136). Thus, for example, the selected template (122) may be either of the template A (118) or the template B (120). Thus, an example of the selected template (122) could also be the template shown in FIG. 4A.

The data repository (100) also may store a modified template (124). The modified template (124) is the selected template (122) after having been modified during a final template generation process. In particular, the modified template (124) is the selected template (122) after the user customization data (102) has been added to the selected template (122) (and possibly calibrated). Generation of the modified template (124) is described with respect to FIG. 2 and FIG. 3B. An example of the modified template (124) is shown in FIG. 4J.

The data repository (100) also may store calibrated customization data (126). The calibrated customization data (126) is the user customization data (102) after having been calibrated for combination with the selected template (122). The calibrated customization data (126) is therefore the user customization data (102), but stripped of information not relevant to generation of the modified template (124), and otherwise modified for use with respect to the selected template (122). Generation of the calibrated customization data (126) is described with respect to FIG. 3B.

The data repository (100) also may store a consumable user interface component (128). The consumable user interface component (128) is information that is consumable by the application (136) to modify aspects of the user interface (138) (defined further below). In particular, the user interface (138) relates to information for modifying non-text aspects of the user interface (138). However, the non-text aspects may include non-text modifications to the text itself, such as for example, the color of the text, font size of the text, etc. The consumable user interface component (128) may also include instructions for modifying the user interface (138) to use different widgets or other user interface aspects, and the arrangements of those widgets or other user interface aspects. Generation of the consumable user interface component (128) is described with respect to FIG. 2 and FIG. 3B. An example of the consumable user interface component (128) is shown in FIG. 4L.

The data repository (100) also may store a user interface artifact (130). The user interface artifact (130) is text that is presented as part of various aspects of the application (136). Thus, the user interface artifact (130) may be text that is displayed in widgets, dialog boxes, etc. Generation of the user interface artifact (130) is described with respect to FIG. 2 and FIG. 3B. An example of the user interface artifact (130) is shown in FIG. 4K.

Figure 5A:
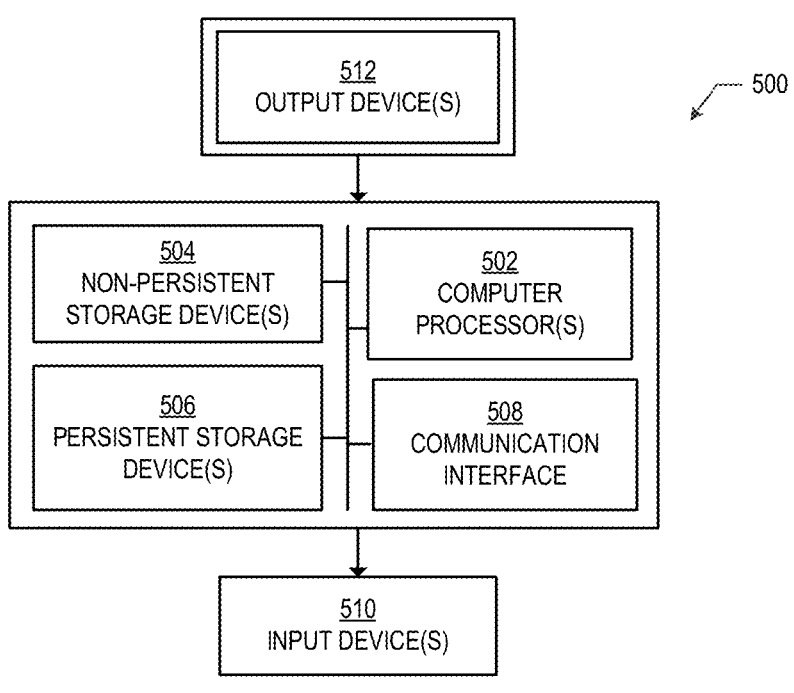
FIG. 5A and FIG. 5B show a computing system, in accordance with one or more embodiments.
Figure 5B:
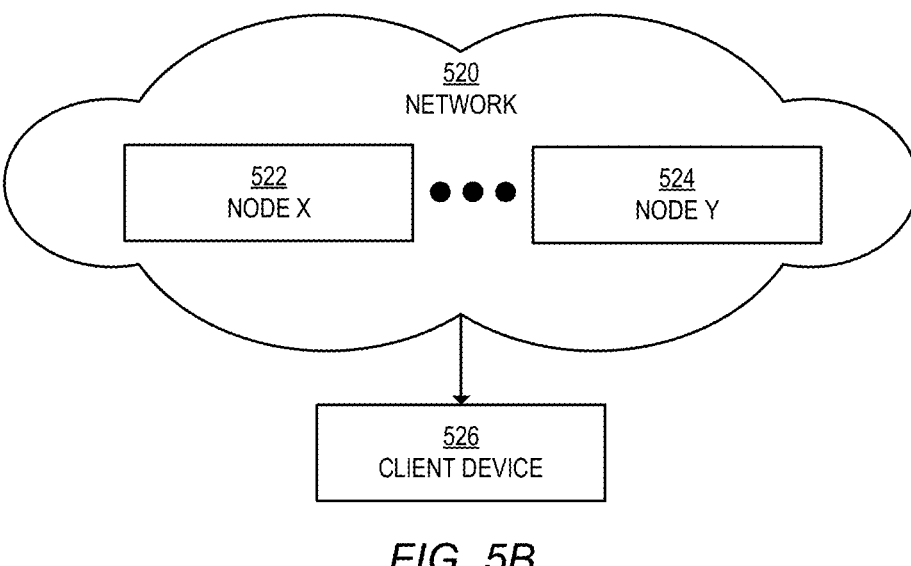

The system shown in FIG. 1 may include additional components. For example, the system shown in FIG. 1 may include a server (132). The server (132) is a computing system, possibly multiple computing systems in a distributed computing environment. An example of the server (132) and a network in which the server (132) operates is shown in FIG. 5A and FIG. 5B.

The server (132) may include a processor (134). The processor (134) is one or more hardware or virtual processing components which may execute one or more applications described herein, or process the data stored in the data repository (100) described above. The processor (134) may be multiple processors, possibly executing in a distributed computing environment. The processor (134) may be the computer processor(s) (502) described with respect to FIG. 5A.

The server (132) may execute an application (136). The application (136) is software or application specific hardware which, when executed by the processor (134), performs one or more automatic computer functions. For example, the application (136) may be a tax application, a web browser, a scientific data analyzer, etc. In an embodiment, the application (136) may be hosted on the platform (142) described below.

The application (136) may include a user interface (138). The user interface (138) is one or more objects displayed on a display device, such as the user interface (160) described further below. The user interface (138) may include interactive components, such as widgets (buttons, drop-down menus, dials, etc.) or dialog boxes (for receiving additional user input). The user interface (138) may include display windows where text or other information is displayed. The user interface (138) may present text in one or more different languages. The user interface (138) may present widgets, dialog boxes, display windows, and other icons or images in a variety of highlighting or different colors. The user interface (138), in one or more embodiments, is the aspect of the application (136) that is being modified.

Thus, the application (136) may have a modified user interface (140). The modified user interface (140) is the user interface (138), after the method of FIG. 2 or the data flow of FIG. 3B has been applied to the user interface (138). The modified user interface (140) may be simpler, or more complex, than the user interface (138) originally provided for the application (136). The modified user interface (140) may include more, fewer, or different widgets and functions for presentation to the user. The modified user interface (140) may change the language, highlighting, or other formatting of text presented to the user. An example of the modified user interface (140) is shown in FIG. 4N.

The server (132) also may include a platform (142). The platform (142) may be the server (132) in some cases. However, more generally the platform (142) is the hardware and software which supports execution of the application (136). For example, the platform (142) may be an enterprise system that hosts a suite of software applications accessible by a user. The suite of applications may include the application (136). The platform (142) also may include other applications not accessible by the user, but which support execution of the suite of applications, such as but not limited to security software, tracking software, storage software, message routing, etc.

The platform (142) may include a prompt generator (144). The prompt generator (144) is software or application specific hardware that, when executed, generates the revised prompt (110). Operation of the prompt generator (144) is described with respect to FIG. 2 and FIG. 3B.

The platform (142) may include a large language model (146). The large language model (146) is software or application specific hardware that, when executed, generates the output (112). The large language model (146) is also a type of machine learning model which is trained on an amount of natural language text data that is considered "large" by a computer scientist (e.g., a terabyte of text data). Examples of the large language model (146) include CHATGPT® by OpenAI OPCO, LLC of San Francisco, California. However, many different types of large language models exist, and the one or more embodiments contemplate use of various different types of large language models for use as the large language model (146). Operation of the large language model (146) is described with respect to FIG. 2 and FIG. 3B.

The platform (142) may include a binder (148). The binder (148) is software or application specific hardware that, when executed, converts the output (112) of the large language model (146) and the selected template (122) (or the modified template (124)) into the consumable user interface component (128) and the user interface artifact (130). The binder (148) includes sub-components, such as the calibrator (150), the template modifier (152), and the template transformer (154), as described below. Thus, the template transformer may receive at least one of a calibrated large language model output generated from the output and a modified template generated from the template, and then generate the consumable user interface components (128) and the user interface artifacts (130) accordingly. Operation of the binder (148) is described with respect to FIG. 2 and FIG. 3B.

The platform (142) may include a template modifier (152). The template modifier (152) is software or application specific hardware that, when executed, converts the selected template (122) into the modified template (124). Operation of the template modifier (152) is described with respect to FIG. 3B.

The platform (142) may include a template transformer (154). The template transformer (154) is software or application specific hardware that, when executed, transforms the output (112) (and/or the calibrated output (114)) with the selected template (122) (and/or the modified template (124)) in order to generate the consumable user interface component (128) and the user interface artifact (130). Operation of the template transformer (154) is described with respect to FIG. 3B.

The system shown in FIG. 1 also may include one or more user devices (156). However, in one or more embodiments, the user devices (156) are remote systems that are not part of the system shown in FIG. 1. For example, the user devices (156) may be individual remote user computers that users use to log into the server (132) and manipulate the application (136). In any case, the user devices (156) are computing systems, such as the computing system shown in FIG. 5A.

Each of the user devices (156) may include a user input device (158). The user input device (158) is a device which a user may use to provide input to the user devices (156), and thereby also to the application (136) or the platform (142), possibly via the server (132). Examples of the user input device (158) include a keyboard, a mouse, a touchscreen, a haptic device, a microphone, etc.

Each of the user devices (156) also may include a user interface (160). The user interface (160) is a device for displaying information to the user. Examples of the user interface (160) may include monitors, video screens, touch screens, haptic devices, speakers, etc. The user interface (160) is distinct from the user interface (138) or the modified user interface (140) shown for the application (136). While the user interface (138) or the modified user interface (140) may be displayed on the user interface (160), the user interface (160) may show other information to the user. For example, the user interface (160) may display various information about the operating system of the particular user device to which the user interface (160) belongs, but also show the modified user interface (140) of the application (136).

From the user's perspective, there may be no difference between the user interface (160) and the modified user interface (140). However, the user interface (160) is generated and displayed by the user devices (156). The user interface (138) or the modified user interface (140), however, is generated by the server (132), possibly via the platform (142). The user interface (138) or the modified user interface (140) may be transmitted to the user devices (156) for display on the user interface (160), for example. Alternatively, the server (132) may transmit instructions to the user devices (156) so that the user interface (160) is commanded to execute code which displays the user interface (138) or the modified user interface (140) of the application (136).

While FIG. 1 shows a configuration of components, other configurations may be used without departing from the scope of one or more embodiments. For example, various components may be combined to create a single component. As another example, the functionality performed by a single component may be performed by two or more components.

Attention is now turned to FIG. 2. FIG. 2 may be characterized as a method of automatically modifying a user interface. The method of FIG. 2 may be executed using the system shown in FIG. 1, possibly in conjunction with the computing system and network environment shown with respect to FIG. 5A and FIG. 5B.

Step 200 may be present in the method of FIG. 2 in one embodiment. Step 200 includes receiving a command to change a user interface of an application. The command includes, or may refer to, user customization data for customizing the user interface of the application. The command may be received from a user. The command may be received automatically from a platform which, based on a user profile of the user, may automatically issue a command to the application to change the user interface of the application. The command also could be received by the application, transmitted to the server, and then implemented based on the remaining steps of FIG. 2. Other variations for receiving the command are also possible.

Step 202 includes generating a revised prompt from user customization data for customizing a user interface of an application, a pre-engineered prompt, and an application artifact from the application. The revised prompt may be generated by feeding the user customization data, the pre-engineered prompt, and the application artifact to the large language model, and ordering the large language model to generate a revised prompt. The revised prompt also may be generated by combining the user customization data, the pre-engineered prompt, and the application artifact according to some pre-defined set of rules and procedures. The revised prompt could be combined by a computer scientist in some embodiments.

Figure 3A:
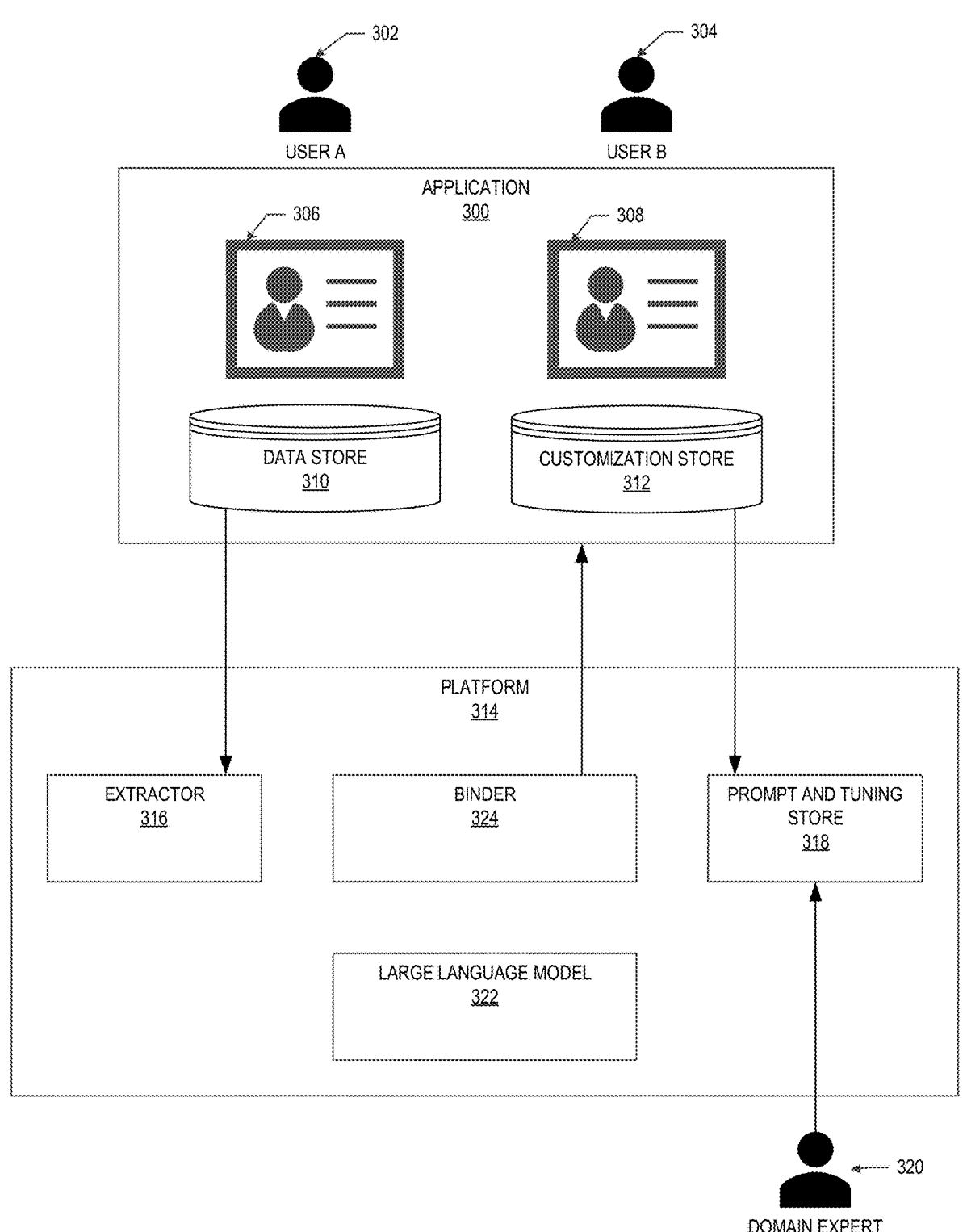
FIG. 3A shows an example of an architecture which may be implemented using the system of FIG. 1, in accordance with one or more embodiments.
Figure 3B:
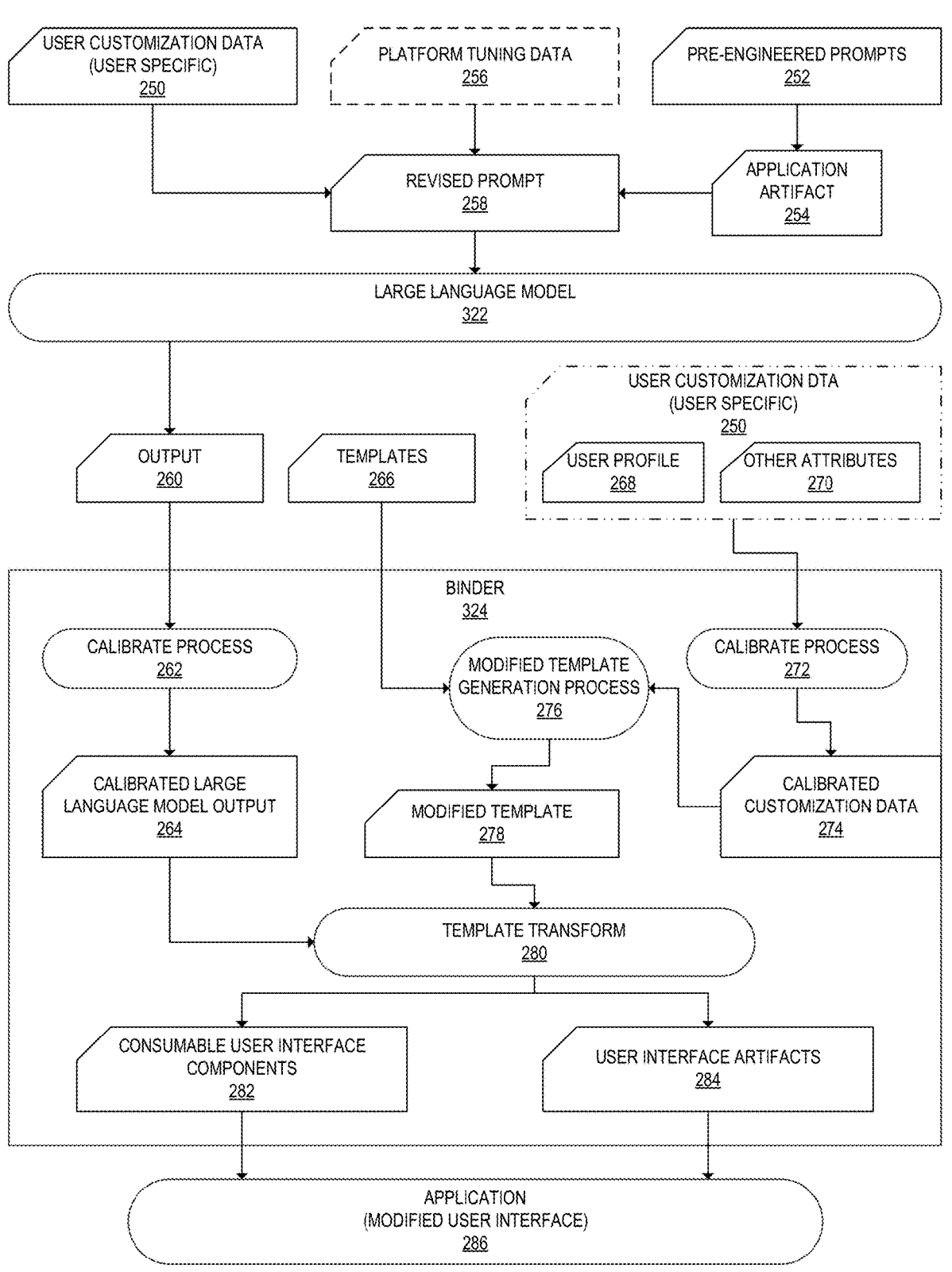
FIG. 3B shows a data flow which may be implemented using the system of FIG. 1, and which may be a variation of the method shown in FIG. 2, in accordance with one or more embodiments.

An example of combining the user customization data the pre-engineered prompt, and the application artifact is shown in FIG. 3B. The example of FIG. 3B shows that the combination of data items may not be a direct combination of the data items. For example, the pre-engineered prompts may be combined with the application artifact, and then that combination combined with the user customization data. In other words, before generating the revised prompt, the application artifact is combined with the pre-engineered prompt. Additionally, the combination may include additional data, such as the platform tuning data, as also describe with respect to FIG. 3B.

Step 204 includes generating an output by executing a large language model on the revised prompt. Generating the output includes first inputting the revised prompt to the large language model. From the perspective of a computer scientist, the input may simply include providing the revised prompt in a command box and instructing the large language model to execute using the revised prompt.

However, generating the output may include, in some embodiments, first converting the revised prompt into a vector in a process known as vectorization or embedding. A vector is an M by N matrix, typically 1 by "N," that includes features and values. A feature is a data entry (e.g., the presence of a word) and a value is a number that reflects either the presence or absence of the word, or some number which reflects a value for the feature in question. The large language model then executes on the vector.

The detailed operations and functions of the large language model itself is beyond the scope of this disclose. However, generally, the functions of the large language model are to find patterns in data (based on the training of the large language model) and then report those patterns as the output. Thus, the input to the large language model includes at least text, and the output of the large language model is other text that is related to the input text. An example of the input (e.g., a revised prompt) and the large language model output is shown in FIG. 4D and FIG. 4E.

Step 206 includes receiving a modified template generated from the user customization data and at least one of multiple templates. In an example, receiving the modified temple may be as simple as receiving one of the pre-determined templates without modification. Thus, while the term "receiving a modified template" is used here, step 206 contemplates use of an unmodified template.

However, in many cases, the template is modified, and so step 206 may refer to receipt of the modified template. The modified template may be generated by combining a selected template (e.g. selected from among pre-determined templates) and customization data (e.g., the calibrated customization data). The selected template may be selected based on rules or procedures. For example, the selected template may be selected from among the available pre-determined templates based on a user setting that indicates a skill level of the user. However, many different bases may be used for determining which of the pre-determined templates is selected for use as the selected template.

The combination of the selected template and the customization data also may involve different procedures. For example, the combination may simply involve adding the calibrated customization data to the relevant data structures in the selected template that are configured to hold the customization data. The combination may be to pre-process the customization data in a manner that makes customization data suitable for inclusion in the selected template. Other combination schemes may be used.

In any case, the modified template generation process generates a modified template from the selected template. Again, however, in a simplified case the modified template may be an unmodified pre-determined template that is selected as the selected template. The modified template will be used in a template transformation process, described below in step 208.

Step 208 includes transforming the output of the large language model and the modified template into both a consumable user interface component and a user interface artifact. Step 208 may be performed using a template transformer.

The transformation process involves combining the large language model output and the modified template into the final components which can be consumed by the application. The binder (e.g., the template transform inside the binder) may, in a simple case, may separate the artifacts (from the modified template) and the consumable user interface components (from the modified template) based on the output of the large language model. In another case, the binder may modify, based on the output of the large language model, the artifacts, the consumable user interface components, or both, present in the modified template. In still another case, the binder is able to offer both the react components as well as raw hypertext markup language (HTML) components generated from the react components for the application to use either ahead of time or during runtime.

The transform process may be performed according to other methods, as well. For example, the transform process may be performed using either a calibrated large language model output generated from the output or a modified template generated from the template, or both (as described above).

Step 210 includes modifying a user interface of the application by applying the consumable user interface component and the user interface artifact to the application. Applying the consumable user interface components and the user interface artifacts may include transmitting the components and artifacts to the application. The application then may be programmed to receive the components and artifacts and modify the user interface of the application accordingly. Alternatively, modifying the user interface may be performed by the consumable user interface components including executable code which, when executed by the processor, configures the application according to other data included with the consumable user interface components, the user interface artifacts, or both.

The user interface may be modified in many different ways. Examples of modifying the user interface may include modifying a language displayed on the user interface. The user interface also may be modified by displaying summarized text that the large language model summarizes from technical text. The user interface also may be modified by highlighting text displayed on the user interface. The user interface also may be modified by altering an altered widget on the user interface. The user interface also may be modified by removing a removed widget from the user interface. The user interface also may be modified by adding an added widget to the user interface. The user interface also may be modified by granting or removing access to functionality of the application. Many other examples of modifying the user interface exist.

The method of FIG. 2 may be varied. For example, the method also may include a step of generating the modified template. The modified template may be generated by receiving a selected template from among a set of templates, receiving the user customization data, and then generating the modified template by combining the at least one of the plurality of templates and the user customization data.

As an example, the user customization data may include a user profile. The data in the user profile may be used to customize the selected template for the user of the application.

In another embodiment, generating the modified template may include calibrating, prior to generating the modified template, the user customization data. Calibrating may include removing extraneous data and enforcing a data structure on the user customization data. For example, the enforced data structure may confirm to a data structure that the application may expect to receive.

In another variation, generating the revised prompt may include executing the large language model on the user customization data, the pre-engineered prompt, and the application artifact in order to generate the revised prompt. However, the platform tuning data also may be included.

In addition, the revised prompt may be further modified. For example, the method also may include calibrating, prior to transforming, the output of the large language model, as described above. Calibrating may include removing extraneous data and enforcing a defined data structure on the output of the large language model.

While the various steps in the flowchart of FIG. 2 are presented and described sequentially, at least some of the steps may be executed in different orders, may be combined or omitted, and at least some of the steps may be executed in parallel. Furthermore, the steps may be performed actively or passively.

FIG. 3A through FIG. 4N show an example of the system of FIG. 1 and the method of FIG. 2. The following example is for explanatory purposes only and not intended to limit the scope of one or more embodiments.

FIG. 3A shows an architecture for a system which may automatically modify a user interface, as described with respect to FIG. 2. Thus, FIG. 3A may be considered a variation of the system shown in FIG. 1.

The architecture of FIG. 3A includes an application (300) used by two users, User A (302) and User B (304). User A (302) uses user interface A (306). User B (304) uses user interface B (308). The user interface A (306) and the user interface B (308) are different, each being configured for the individual preferences of the User A (302) and User B (304), respectively.

The application (300) also includes a data store (310). The data store (310) includes information such as artifacts used by the application (300), user interface settings of the application (300), and other information about the application (300).

The application (300) also includes a customization store (312). The customization store (312) stores information relevant to the users. Thus, for example, the customization store (312) may store user profiles for User A (302) and User B (304), and may also store other information that may be useful to the platform (314) for use in customizing the user interface A (306) or the user interface B (308).

The system also includes the platform (314). The platform (314) is an enterprise system that supports execution of the application (300). The platform (314) also includes the software or hardware components used to modify the user interface A (306) or the user interface B (308).

The platform (314) includes an extractor (316). The extractor (316) extracts resources, artifacts, and other information from the data store (310) of the application (300).

The platform (314) also includes a prompt and tuning store (318). The prompt and tuning store (318) stores pre-engineered prompts developed for use by the large language model (322). The pre-engineered prompts may be developed, at least in part, by a domain expert (320) who is a subject matter expert in the application (300), the subject matter of the application (300) (e.g., a tax expert if the application (300) is a tax application), or other useful field. The prompt and tuning store (318) also may store tuning data that the platform (314) may use when customizing the user interface A (306) or the user interface B (308).

The platform (314) also includes the large language model (322). The large language model (322) may be the large language model (146) of FIG. 1.

The platform (314) also includes a binder (324). The binder (324) combines the information extracted by the extractor (316) and the information from the prompt and tuning store (318) to generate a revised prompt. The binder (324) also inputs the revised prompt into the large language model (322). The binder (324) also transforms the output of the large language model (322) to the consumable user interface components and the user interface artifacts that are used to configure or reconfigure one or both of the user interface A (306) and the user interface B (308).

FIG. 3B shows a data flow for modifying a user interface using the architecture shown in FIG. 3A. FIG. 3B and FIG. 3A share common reference numerals to refer to common objects. Thus, for example, FIG. 3B shows details of the binder (324) and refers to the large language model (322), both shown in FIG. 3A. The data flow shown in FIG. 3B may be considered a variation of the method described with respect to FIG. 2. As shown in FIG. 3B, clipped boxes refer to data elements. Rounded boxes refer to processes or algorithms (whether software or application specific hardware).

The data flow of FIG. 3B begins with user customization data (250), pre-engineered prompts (252), an application artifact (254), and, in an embodiment, platform tuning data (256). The user customization data (250) may be retrieved from the data store (310) or the customization store (312) (see FIG. 3A). The user customization data (250) is specific to the user, and may include, for example, a user profile.

The pre-engineered prompts (252) are prompts useable with the large language model (322), but which have been previously constructed and stored in the prompt and tuning store (318). The pre-engineered prompts (252) are being used in the data flow of FIG. 3B.

The pre-engineered prompts (252) is combined with the application artifact (254). The application artifact (254) is text from the application, that could be stored in the data store (310) or the customization store (312) of the application (300) (see FIG. 3A). Thus, the pre-engineered prompts (252) are combined with the application artifact (254) to provide for a customized pre-engineered prompt that is relevant to the particular user interface to be configured.

If desirable, the pre-engineered prompts (252) also may be included together with the user customization data (250), the pre-engineered prompts (252), and the application artifact (254). The platform tuning data (256) may include, for example, settings that the platform (314) (FIG. 3A) provides to the application when a particular user interface setting is selected. In a specific example, the platform tuning data (256) could include information that the application will use to present additional functionality for the application when a more advanced user interface is to be presented to the user.

The user customization data (250), the pre-engineered prompts (252), the application artifact (254), and (in an embodiment) the platform tuning data (256) are combined into a revised prompt (258). The revised prompt (258) is generated by adding to, subtracting form, or otherwise modifying the pre-engineered prompts (252). In an embodiment, the revised prompt (258) may be generated by feeding the user customization data (250), the pre-engineered prompts (252), the application artifact (254) and, possibly, the platform tuning data (256)) to the large language model (322) of FIG. 3A. The output of the large language model (322), in this case is the revised prompt (258). However, the revised prompt (258) may also be generated by combining the information according to pre-determined rules.

The large language model (322) then takes the revised prompt (258) as input. The output (260) of the large language model (322) then may be provided to a calibrate process (262). The calibrate process (262), if desirable, may calibrate the output (260) to generate a calibrated large language model output (264). The calibration process may remove extraneous data, change the data structure or the arrangement of data, or otherwise put the output (260) into a format which is desirable for input to a template transform (280).

Concurrently, or sequentially, a modified template (278) is generated. The process begins with a selected template being selected from a set of templates (266). The selected template is provided to a modified template generation process (276). The modified template generation process (276) is software or application specific hardware that modifies the selected template, as indicated below.

Additionally, the user customization data (250) in this example includes a user profile (268) and other attributes (270). The other attributes (270) includes settings for the application with respect to a particular user or user type. The user customization data (250) is calibrated in a calibration process (272). The calibration process (272) is similar to the calibrate process (262). However, instead of calibrating the output (260) of the large language model (322), the user customization data (250) is calibrated for use with the template transform (280). Thus, for example, extraneous information may be removed, additional information may be added, and the data format of the user customization data (250) may be modified for use by the template transform (280).

The result of the calibration process (272) is calibrated customization data (274). The calibrated customization data (274) and the templates (266) together are provided to the modified template generation process (276). The modified template generation process (276) is software or application specific hardware which is programmed to add the calibrated customization data (274) to the selected template from the templates (266). The modified template generation process (276) may perform other functions, such as to further process the calibrated customization data (274) and the selected template from the templates (266) for consumption by the template transform (280). The output of the modified template generation process (276) is the modified template (278).

The modified template (278) and the calibrated large language model output (264) are then provided to the template transform (280). The template transform (280) may be software or application specific hardware programmed to convert the calibrated large language model output (264) and the modified template (278) to consumable user interface components (282) and user interface artifacts (284).

In an embodiment, the template transform (280) may be the large language model (322). Thus, for example, the calibrated large language model output (264) and the modified template (278) may be provided to the large language model (322), together with another one of the pre-engineered prompts (252), in order to generate the consumable user interface components (282) and the user interface artifacts (284) as output of the large language model (322). However, the template transform (280) also may be rules or polices which, when execute, generate the consumable user interface components (282) and the user interface artifacts (284) from the calibrated large language model output (264) and the modified template (278).

Once generated, the consumable user interface components (282) and the user interface artifacts (284) are provided to the application (286), which may be the application (136) of FIG. 1. The application (286) uses the consumable user interface components (282) and the user interface artifacts (284) to modify the user interface of the application (286). For example, the consumable user interface components (282) may be applied to the user interface of the application (286) to adjust the number, type, and placement of widgets, dialog boxes, and display screens of the user interface. The user interface artifacts (284) may be used to change the language or words used in or near the widgets, dialog boxes, and display screens of the user interface.

FIG. 4A through FIG. 4L show data blocks or code snippets used with respect to the data flow show in FIG. 3B. The examples shown in FIG. 4A through FIG. 4L may be varied, and thus should not be deemed to limit one or more embodiments or the claims, unless specifically stated otherwise.

FIG. 4A shows an example of user customization data (400). The user customization data (400) may be the user customization data (250) of FIG. 3B.

FIG. 4B shows an example of tuning data (402). The tuning data (402) may be the platform tuning data (256) of FIG. 3B.

FIG. 4C shows an example of a pre-engineered prompt (404). The pre-engineered prompt (404) may be the pre-engineered prompt (252) of FIG. 3B.

FIG. 4D shows an example of a revised prompt (406). The revised prompt (406) may be the revised prompt (258) of FIG. 3B.

FIG. 4E shows an example of an large language model output (408). The large language model output (408) may be the output (260) of FIG. 3B.

FIG. 4F shows a user profile (410). The user profile (410) may be the user profile (268) of FIG. 3B.

FIG. 4G shows an example of an application artifact (412). The application artifact (412) may be the application artifact (254) of FIG. 3B. The application artifact in this example represents application settings to be applied to the pre-engineered prompt (404).

FIG. 4H shows an example of a template (414). The template (414) may be the selected template selected from among the templates (266) FIG. 3B.

FIG. 4I shows an example of customization data (416). The (416) may be the calibrated customization data (274) of FIG. 3B.

FIG. 4J shows an example of a modified template (418). The modified template (418) may be the modified template (278) of FIG. 3B.

FIG. 4K shows an example of user interface artifacts (420). The user interface artifacts (420) may be the user interface artifacts (284) of FIG. 3B.

FIG. 4L shows an example of consumable user interface components (422). The consumable user interface components (422) may be the consumable user interface components (282) of FIG. 3B.

Figure 4M:
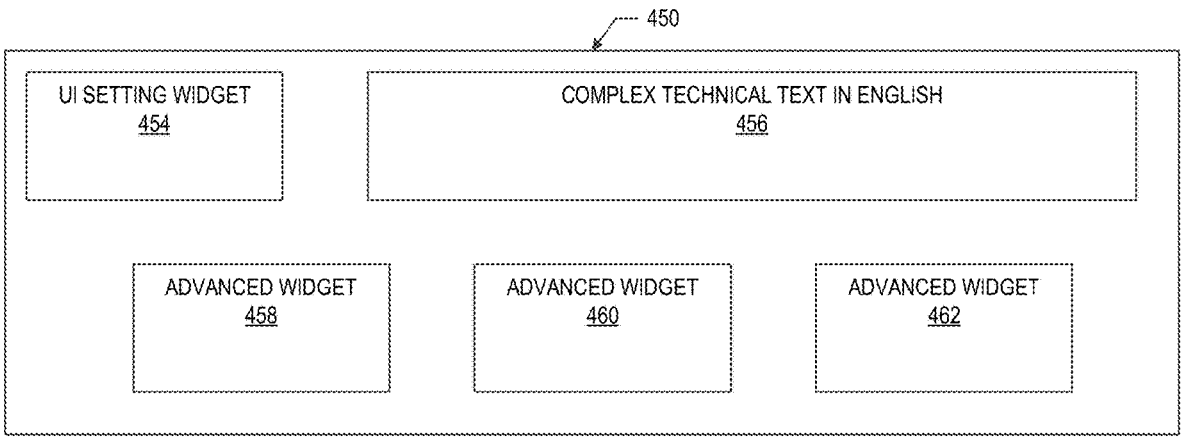
Figure 4N:
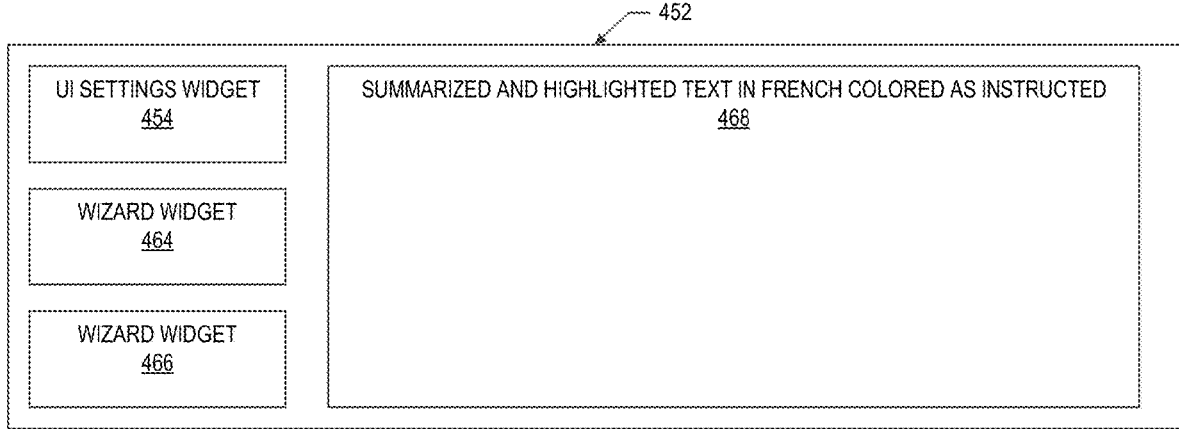

FIG. 4M and FIG. 4N show an example of user interface (450) and a modified user interface (452). The user interface (450) may be the user interface (138) of FIG. 1 (or the user interface A (306) or the user interface B (308) of FIG. 3A). The modified user interface (452) may be the modified user interface (140) of FIG. 1 (or the modified user interface of the application (286) in FIG. 3B).

The user interface (450) is an advanced user interface intended for use by users trained in the full functionality of the application and who is also a subject matter expert in the field for which the application is programmed. In this specific example, the application is tax preparation software, and the user interface (450) is an advanced user interface intended for use by a certified public accountant who also is trained in the full functionality of the tax application.

The user interface (450) includes a user interface setting (shown as UI setting widget (454)). The UI settings widget (454) permits the user to change the user interface, if the user desires. Otherwise, the user interface (450) shows a dialog box (456) which shows complex technical text in the English language. Because the user is a subject matter expert in tax matters, the user desires to view the complex technical text.

The user interface (450) also provides a number of advanced widgets for use by the user, including advanced widget (458), advanced widget (460), and advanced widget (462). The three advanced widgets each provide different functionality for manipulating the complex technical text in the dialog box (456). Each of the advanced widgets may require technical knowledge of how the application functions in order to use effectively. However, because the user is trained in use of the application, the user desires to take advantage of the maximum control and power that the application can offer to the user.

Later, another user belonging to the same tax preparation company as the advanced user (the certified public accountant) signs in to the application via an online portal. This action is permitted by the tax preparation software company that builds and maintains the tax preparation application. The other user is an assistant to the certified public account. The assistant is a book keeper with limited training in tax matters, relative to the certified public accountant. Additionally, the assistant's native language is French, not English. However, the assistant has been tasked with performing certain data entry duties using the tax preparation application, and with generating basic reports that lie within the skill level of the assistant.

The assistant selects the UI setting widget (454), which brings up a pop-up dialog box (not shown). The assistant indicates that the assistant's user profile should now be used, not the user profile of the certified public accountant. In an embodiment, the assistant may select an "easy use" setting in the pup-up dialog box, along with the selection of a new user profile.

Upon acceptance, the platform supporting the application executes the data flow shown in FIG. 3B (or the method of FIG. 2 using the system of FIG. 1). As a result, the modified user interface (452) of FIG. 4N is generated. The modified user interface (452) still shows the UI settings widget (454). The modified user interface (452) includes fewer widgets, such as wizard widget (464) and wizard widget (466). The wizard widgets do not have the power or fine control that the application could use when manipulating the tax data to generate complex tax returns. However, the wizard widgets represent a single button that the assistant can use to perform the employment duties to which the assistant has been assigned. For example, the wizard widget (464) may be a data entry wizard that guides the assistant through the process of correctly entering the tax data the assistant was assigned to enter. The wizard widget (466) may be a report wizard that guides the assistant through the process of generating the reports requested by the assistant's employer.

Additionally, a new, enlarged dialog box (468) is shown. Instead of displaying the complex technical text in English, as shown in the dialog box (456) of FIG. 4M, the enlarged dialog box (468) in FIG. 4N shows a summarized version of the complex technical text. Additionally, the text has been automatically translated into French, and then highlighted to show the kinds of information in which the assistant is interested. Thus, the assistant is able to perform the assistant's duties much more easily than had the assistant been required to use the user interface (450) of FIG. 4M, which is designed for use by an advanced user.

When the assistant is finished, the certified public accountant again wishes to use the advanced version (or some other version) of the user interface of the application. Thus, the certified public accountant selects the UI settings wizard (454) in the modified user interface (452). In a new pop-up dialog box (not shown), the certified public accountant selects the profile of the certified public accountant and selects the type of user interface that the certified public accountant desires to use. Again, the workflow of FIG. 2 or FIG. 3B is executed, and the user interface (450) is again shown to the user.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. One or more processors may include a central processing unit (CPU), a graphics processing unit (GPU), a tensor processing units (TPU), combinations thereof, etc.

The input devices (510) may include a touchscreen, keyboard, mouse, microphone, touchpad, electronic pen, or any other type of input device. The input devices (510) may receive inputs from a user that are responsive to data and messages presented by the output devices (512). The inputs may include text input, audio input, video input, etc., which may be processed and transmitted by the computing system (500) in accordance with the disclosure. The communication interface (508) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output devices (512) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output devices (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the word "or" is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   generating a revised prompt from user customization data for customizing a user interface of an application, a pre-engineered prompt, and an application artifact from the application;
   generating an output by executing a large language model on the revised prompt;
   receiving a modified template generated from the user customization data and at least one of a plurality of templates;
   transforming the output of the large language model and the modified template into both a consumable user interface component and a user interface artifact; and
   modifying a user interface of the application by applying the consumable user interface component and the user interface artifact to the application.

2. The method of claim 1, further comprising:
   generating the modified template.

3. The method of claim 1, further comprising:
   receiving the at least one of the plurality of templates;
   receiving the user customization data; and
   generating the modified template by combining the at least one of the plurality of templates and the user customization data.

4. The method of claim 3, wherein the user customization data includes a user profile.

5. The method of claim 3, further comprising:
   calibrating, prior to generating the modified template, the user customization data by removing extraneous data and enforcing a data structure on the user customization data.

6. The method of claim 1, wherein generating the revised prompt comprises:

executing the large language model on the user customization data, the pre-engineered prompt, and the application artifact in order to generate the revised prompt.

7. The method of claim 1, wherein modifying the user interface comprises at least one of:

modifying a language displayed on the user interface, and displaying summarized text that the large language model summarizes from technical text.

8. The method of claim 1, wherein modifying the user interface comprises at least one of:

highlighting text displayed on the user interface, altering an altered widget on the user interface, removing a removed widget from the user interface, adding an added widget to the user interface, and granting or removing access to functionality of the application.

9. The method of claim 1, further comprising:

calibrating, prior to transforming, the output of the large language model by removing extraneous data and enforcing a defined data structure on the output of the large language model.

10. The method of claim 1, further comprising:

combining, before generating the revised prompt, the application artifact to the pre-engineered prompt.

11. The method of claim 1, wherein generating the revised prompt further comprises:

generating the revised prompt from all of the user customization data, the pre-engineered prompt, the application artifact, and platform tuning data for use in tuning the application.

12. A system comprising:

a processor;

a data repository in communication with the processor, the data repository storing:

user customization data, a pre-engineered prompt, an application artifact, a revised prompt, an output of a large language model, a template selected from among a plurality of templates, a modified template, a consumable user interface component, and a user interface artifact; and a platform executable by the processor, the platform comprising:

a prompt generator which, when executed by the processor, generates the revised prompt from the user customization data, the pre-engineered prompt, and the application artifact, a large language model which, when executed by the processor:

receives, as input, the revised prompt, and generates the output, and a binder which, when executed by the processor, receives the modified template, and transforms the output and the modified template into both the consumable user interface component and the user interface artifact; and an application executable by the processor, wherein the application comprises a user interface that is programmed to modify the user interface by applying the consumable user interface component and the user interface artifact to the application.

13. The system of claim 12, wherein the prompt generator, when executed by the processor, further generates the revised prompt by generating the revised prompt from all of the user customization data, the pre-engineered prompt, the application artifact, and platform tuning data for use in tuning the application.

14. The system of claim 13, wherein the prompt generator comprises the large language model.

15. The system of claim 12, further comprising:

a calibrator which, when executed by the processor prior to transforming, generates calibrated output by calibrating the output of the large language model by removing extraneous data and enforcing a defined data structure on the output of the large language model.

16. The system of claim 12, further comprising:

a calibrator which, when executed by the processor, further calibrates the user customization data to generate calibrated customization data.

17. The system of claim 16, further comprising:

a template modifier which, when executed by the processor, generates the modified template by combining the template and the calibrated customization data.

18. The system of claim 12, further comprising:

a template transformer, which when executed by the processor:

receives at least one of a calibrated large language model output generated from the output and a modified template generated from the template, and transforms the at least one of the calibrated large language model output and the modified template into the consumable user interface component and the user interface artifact.

19. The system of claim 12, further comprising:

a binder which, when executed by the processor:

generates the consumable user interface component and the user interface artifact by combining the output, the user customization data, and the template.

20. A method comprising:

receiving a command to change a user interface of an application, wherein the command includes or refers to user customization data for customizing the user interface of the application;

generating a revised prompt from the user customization data, a pre-engineered prompt, and an application artifact from the application;

generating an output by executing a large language model on the revised prompt;

receiving a modified template generated from the user customization data and at least one of a plurality of templates;

transforming the output of the large language model and the modified template into both a consumable user interface component and a user interface artifact; and modifying a user interface of the application by applying the consumable user interface component and the user interface artifact to the application.

\* \* \* \* \*